US008003060B2

(12) United States Patent
Cracauer et al.

(10) Patent No.: US 8,003,060 B2
(45) Date of Patent: Aug. 23, 2011

(54) REACTION VESSEL WITH INTEGRATED OPTICAL AND FLUID CONTROL ELEMENTS

(75) Inventors: Raymond Francis Cracauer, Beulah, CO (US); Rocky Ganske, Acton (CA); Adam Brian Liederman, Toronto (CA)

(73) Assignee: Axela Inc., Etobicoke, Ontario (CA)

(*) Notice: Subject to any disclaimer, the term of this patent is extended or adjusted under 35 U.S.C. 154(b) by 560 days.

(21) Appl. No.: 12/153,366

(22) Filed: May 16, 2008

(65) Prior Publication Data

US 2008/0286858 A1 Nov. 20, 2008

Related U.S. Application Data

(60) Provisional application No. 60/924,543, filed on May 18, 2007.

(51) Int. Cl.
*G01N 21/03* (2006.01)

(52) U.S. Cl. ......................... 422/413; 422/404; 422/430

(58) Field of Classification Search .................... 422/57, 422/58, 61, 82.05, 102, 104, 404, 413, 430, 422/503, 512, 570; 435/287.6, 288.7
See application file for complete search history.

(56) References Cited

U.S. PATENT DOCUMENTS

| | | | | |
|---|---|---|---|---|
| 6,838,055 | B2 * | 1/2005 | Sando et al. | 422/100 |
| 6,893,880 | B2 * | 5/2005 | Carpenter | 436/514 |
| 7,629,178 | B2 * | 12/2009 | Davis et al. | 436/514 |
| 7,682,817 | B2 * | 3/2010 | Cohen et al. | 435/287.1 |
| 7,723,099 | B2 * | 5/2010 | Miller et al. | 435/287.1 |
| 2005/0063863 | A1 * | 3/2005 | Columbus | 422/58 |
| 2005/0148063 | A1 * | 7/2005 | Cracauer et al. | 435/287.2 |
| 2005/0221281 | A1 | 10/2005 | Ho | |
| 2006/0137434 | A1 | 6/2006 | Cohen et al. | |
| 2007/0025876 | A1 * | 2/2007 | Nishijima et al. | 422/64 |
| 2007/0264707 | A1 | 11/2007 | Liederman et al. | |

FOREIGN PATENT DOCUMENTS

WO WO 98/19164 5/1998

* cited by examiner

*Primary Examiner* — Jill Warden
*Assistant Examiner* — Joye L Woodard
(74) *Attorney, Agent, or Firm* — Hill & Schumacher; Lynn C. Schumacher

(57) ABSTRACT

The present invention provides disposable, semi-reusable, or single use reaction vessels with integrated optical elements for use with diffraction based assay systems. The vessel for assaying liquids for analytes includes a housing having at least one chamber or well for receiving a liquid therein and an optical element integrally formed with the housing for directing an incident light beam towards the well or chamber and directing a light beam away from the reaction chamber after the light beam has interacted with analytes present in the liquid.

29 Claims, 11 Drawing Sheets

REACTION VESSEL WITH INTEGRATED OPTICAL AND FLUID CONTROL ELEMENTS

CROSS REFERENCE TO RELATED UNITED STATES PATENT APPLICATION

This patent application relates to U.S. Provisional patent application Ser. No. 60/924,543 filed on May 18, 2007, entitled REACTION VESSEL WITH INTEGRATED OPTICAL AND FLUID CONTROL ELEMENTS, which is incorporated herein in its entirety by reference.

FIELD OF THE INVENTION

The present invention relates to disposable, semi-reusable, or single use reaction vessels with integrated optical elements for use with optical based assay systems.

BACKGROUND OF THE INVENTION

With the rapid emergence of diverse locations for performing biological, bio-chemical and chemical assays, the ability to perform these assays in highly decentralized settings under conditions that are not stringently controlled while using personnel with minimal training has become increasingly important. Often, properly trained personnel are either too expensive or simply unavailable. For example, many specialty medical clinics are offering diagnostic tests on-site to allow more rapid diagnosis and treatment. Recent developments have mass-market retailers adding walk-in clinics to the services offered to customers. A means of rapid on-site testing that does not require trained personnel would facilitate these trends. Devices classified as CLIA waived by the US FDA are examples of this level of simplicity of operation. Growing needs for identification of potential bio-agents in remote areas for defense or civilian applications, water quality monitoring and the like have similar requirements. All of these applications may present challenges including: turbid or essentially opaque samples necessitating complex sample preparation methods, high sensitivity and specificity requirements and containment of potentially hazardous samples. In many cases, it is also desirable to test for multiple compounds of interest simultaneously.

There exist assay formats and devices that meet some of the requirements presented above. Lateral flow devices are well established as simple to use and read mechanisms for biological assays. However, these devices typically offer less sensitivity than is desired for many applications. Simultaneous detection of multiple analytes, particularly ones where concentrations of interest vary widely or for which the fundamental assay processes vary is also problematic. Techniques exist which can deal with variable samples but are typically too complex to be used with minimally trained personnel or in harsh environments.

A detection technology that can overcome many of these obstacles utilizes diffractive patterns constructed of binding molecules as a detection element. Current embodiments of this technology, such as those described in United States Patent Publication No. 20050148063 entitled DISPOSABLE REACTION VESSEL WITH INTEGRATED OPTICAL ELEMENTS, and U.S. patent application Ser. No. 11/798,034 entitled AUTOMATED ANALYZER USING LIGHT DIFFRACTION filed May 9, 2007 (US Patent Publication No. 20070264707) claiming priority from U.S. Provisional Patent Application Ser. No. 60/798,719 filed on May 9, 2006, in English, entitled AUTOMATED ANALYZER USING LIGHT DIFFRACTION, (each being incorporated herein by reference in their entirety) while offering many advantages, do not have the simplicity and compactness that are required to meet the needs of highly decentralized testing.

It would therefore be advantageous to provide an economical and easy to use assay chamber for sample assays that provides simple sample acquisition, ease of use, high assay sensitivity and sample containment, and which is readily disposable and can potentially meet the requirements of CLIA waived standards.

SUMMARY OF THE INVENTION

To address the problems described above, the present invention integrates an optical element such as a prism (or other optical element) with a reaction chamber, means for acquisition of sample, optional storage for any required reagents, containment of wastes and the capability for detection of either single or multiple analytes.

In one aspect of the invention there is provided a disposable reaction vessel, comprising:

a) a housing including a first housing section and a second housing section form fitted to said first housing section so that when the first and second housing sections are assembled to form said housing they are in sealing relationship;

b) a reaction chamber located inside of said housing;

c) an optical element integrally formed on an outside surface of the second housing section and located adjacent to said reaction chamber on the inside of the housing, said second housing section being at least partially constructed of a material which will transmit light to and from the reaction chamber;

d) a waste reservoir located on an interior of said housing, e) a first flow passageway between said reaction chamber and said waste reservoir;

f) reagent and sample inlets located at a first end portion of said housing;

g) a second flow passageway between said reagent and sample inlets and said reaction chamber;

h) an end cap having a size and shape to slide over said first end portion and snap fit thereon to be locked onto said housing and form a leak tight seal, wherein said end cap includes at least one liquid reservoir for holding reagents and/or liquid sample, said at least one liquid reservoir including pierceable sealing means, and wherein said reagent and sample inlets pierce said pierceable sealing means when said end cap is slid onto said housing;

i) pattern of analyte-specific receptors bound to an inner surface of the reaction chamber, the patterned area being substantially surrounded by an array of radially oriented microfluidic channels configured to direct fluid from said reaction chamber radially outward to said first flow passageway; and said optical element to direct directs a light beam to the reaction chamber for interrogating the pattern of analyte specific receptors, wherein the light beam interacts with the pre-selected pattern of analyte specific receptors and analytes bound thereto, and wherein the light beam that interacts with the pre-selected pattern of analyte-specific receptors and analytes bound thereto is a diffracted light beam which is directed away from said inner surface by said optical element.

In another aspect of the invention there is provided a disposable reaction vessel, comprising:

a) a housing including a first housing section and a second housing section form fitted to said first housing section so that when the first and second housing sections are assembled to form said housing they are in sealing relationship;

b) a reaction chamber located inside of said housing;

c) an optical element integrally formed on an outside surface of the second housing section and located adjacent to said reaction chamber on the inside of the housing, said second housing section being at least partially constructed of a material which will transmit light to and from the reaction chamber;

d) a waste reservoir located on an interior of said housing, e) a first flow passageway between said reaction chamber and said waste reservoir;

f) at least one sample inlet and at least one reagent inlet located at a first end portion of said housing;

g) a second flow passageway between said reagent and sample inlets and said reaction chamber;

h) an end cap having a size and shape to slide over said first end portion and snap fit thereon to be locked onto said housing and form a leak tight seal, and wherein said end cap includes a separate liquid reservoir for holding reagents or liquid sample associated with each of the inlets and pierceable sealing means sealing each liquid reservoir, and wherein each inlet includes a piercing means associated therewith for piercing said pierceable sealing means, i) a pattern of analyte-specific receptors bound to an inner surface of the reaction chamber, the patterned area being substantially surrounded by an array of radially oriented microfluidic channels configured to direct fluid from said reaction chamber radially outward to said first flow passageway; and said optical element to direct a light beam to the reaction chamber for interrogating the pattern of analyte specific receptors, wherein the light beam interacts with the pre-selected pattern of analyte specific receptors and analytes bound thereto, and wherein the light beam that interacts with the pre-selected pattern of analyte-specific receptors and analytes bound thereto is a diffracted light beam which is directed away from said inner surface by said optical element.

A further understanding of the functional and advantageous aspects of the invention can be realized by reference to the following detailed description and drawings.

BRIEF DESCRIPTION OF THE DRAWINGS

The following is a description, by way of example only, of disposable reaction vessels with integrated optical elements constructed in accordance with the present invention, reference being had to the accompanying drawings, in which:

FIG. 10 B is a detail section view of the cap partially installed on the lower housing section.

DETAILED DESCRIPTION OF THE INVENTION

Generally speaking, the systems described herein are directed to reaction vessels with integrated optical and fluid control elements for use in diffraction based assays. As required, embodiments of the present invention are disclosed herein. However, the disclosed embodiments are merely exemplary, and it should be understood that the invention may be embodied in many various and alternative forms. The Figures are not to scale and some features may be exaggerated or minimized to show details of particular elements while related elements may have been eliminated to prevent obscuring novel aspects. Therefore, specific structural and functional details disclosed herein are not to be interpreted as limiting but merely as a basis for the claims and as a representative basis for teaching one skilled in the art to variously employ the present invention. For purposes of teaching and not limitation, the illustrated embodiments are directed to reaction vessels with integrated optical and fluid control elements for use in diffraction based assays.

As used herein, the term “about”, when used in conjunction with ranges of dimensions of particles or other physical properties or characteristics, is meant to cover slight variations that may exist in the upper and lower limits of the ranges of dimensions so as to not exclude embodiments where on average most of the dimensions are satisfied but where statistically dimensions may exist outside this region. It is not the intention to exclude embodiments such as these from the present invention.

Figure 1A:
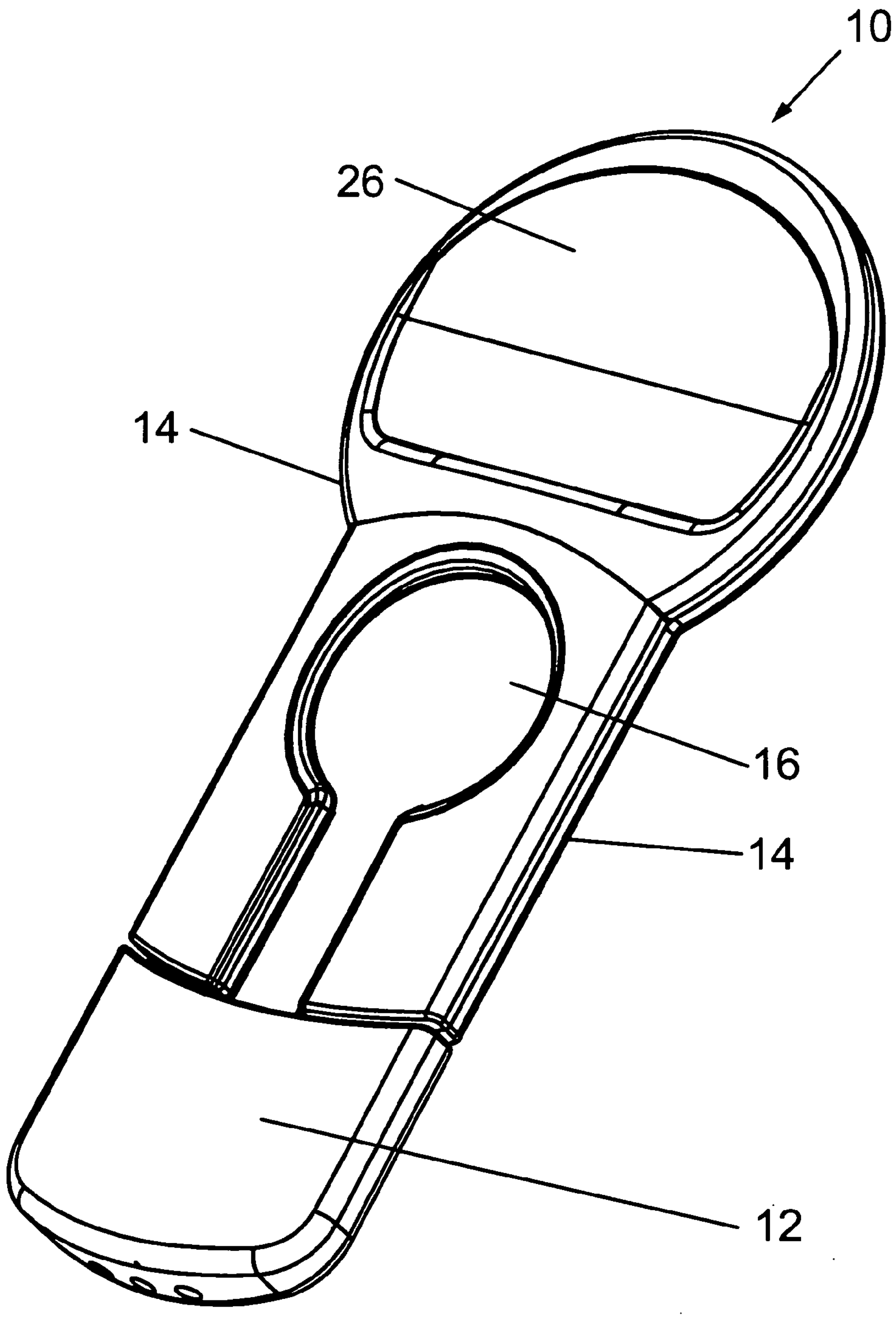
FIG. 1A is a perspective view of a disposable reaction vessel with an integrated optical element having an analyte-specific pattern in a single reaction chamber with a prism integrally formed with the bottom of the reaction chamber.

A number of embodiments of the present invention are possible for differing applications. The following description is illustrative of one embodiment and is not meant to be limiting. FIG. 1A shows an assembled view of the reaction vessel at 10 which includes an end cap 12, an upper housing section 14 which incorporates a transmission window 16. End cap 12 is designed to be readily installed on the rest of the assembled housing but not readily removed and may optionally provide fluid reservoirs for the performance of the assay as described hereinafter. Cap 12 is designed to be a snap fit such that once installed it may not be removed non-destructively. Cap 12 also provides an essentially hermetic seal to isolate potentially hazardous materials within the reaction vessel. The upper housing includes surface 26. Surface 26 provides an essentially flat surface to which human readable labeling, or machine readable labeling such as barcodes or radio frequency identification (RFID) devices may be affixed. End cap 12 is preferably designed such that the cap 12 can only be installed in the correct orientation and such that the orientation is obvious to the clinician. End cap 12 is preferably labelled to indicate identity of the liquid reagents sealed therein using human and/or machine readable labels similar to the rest of the housing discussed hereinafter.

Figure 1B:
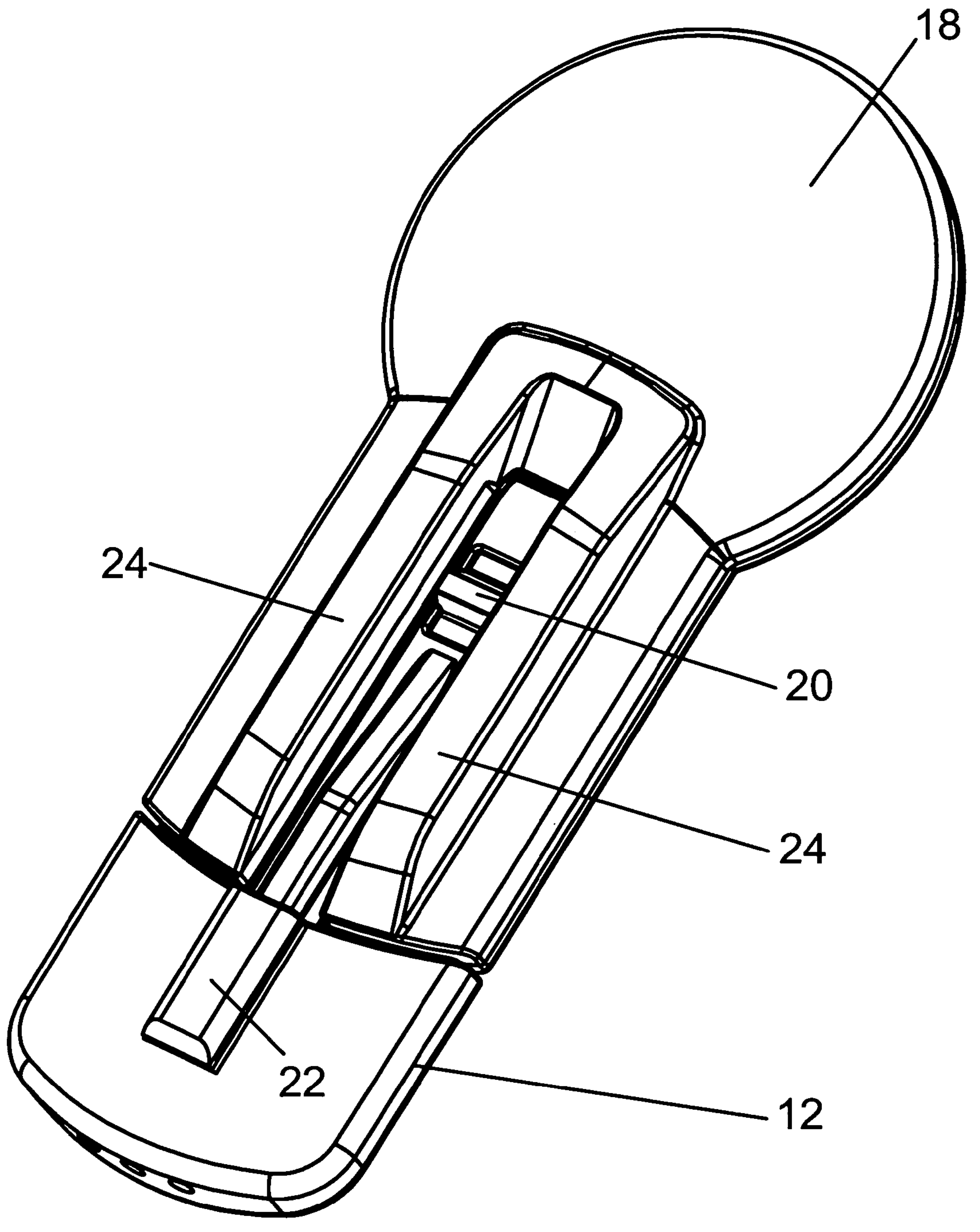
FIG. 1B is a perspective view of the opposite face of the reaction vessel shown in FIG. 1A.

FIG. 1B is a view of the reverse side of the reaction vessel showing lower housing 18 comprising an integrated optical element 20, keying mechanism 22 and guide rails 24. Keying mechanism 22 and guide rails 24 provide mechanical interface and alignment to an analytical instrument.

Figure 2:
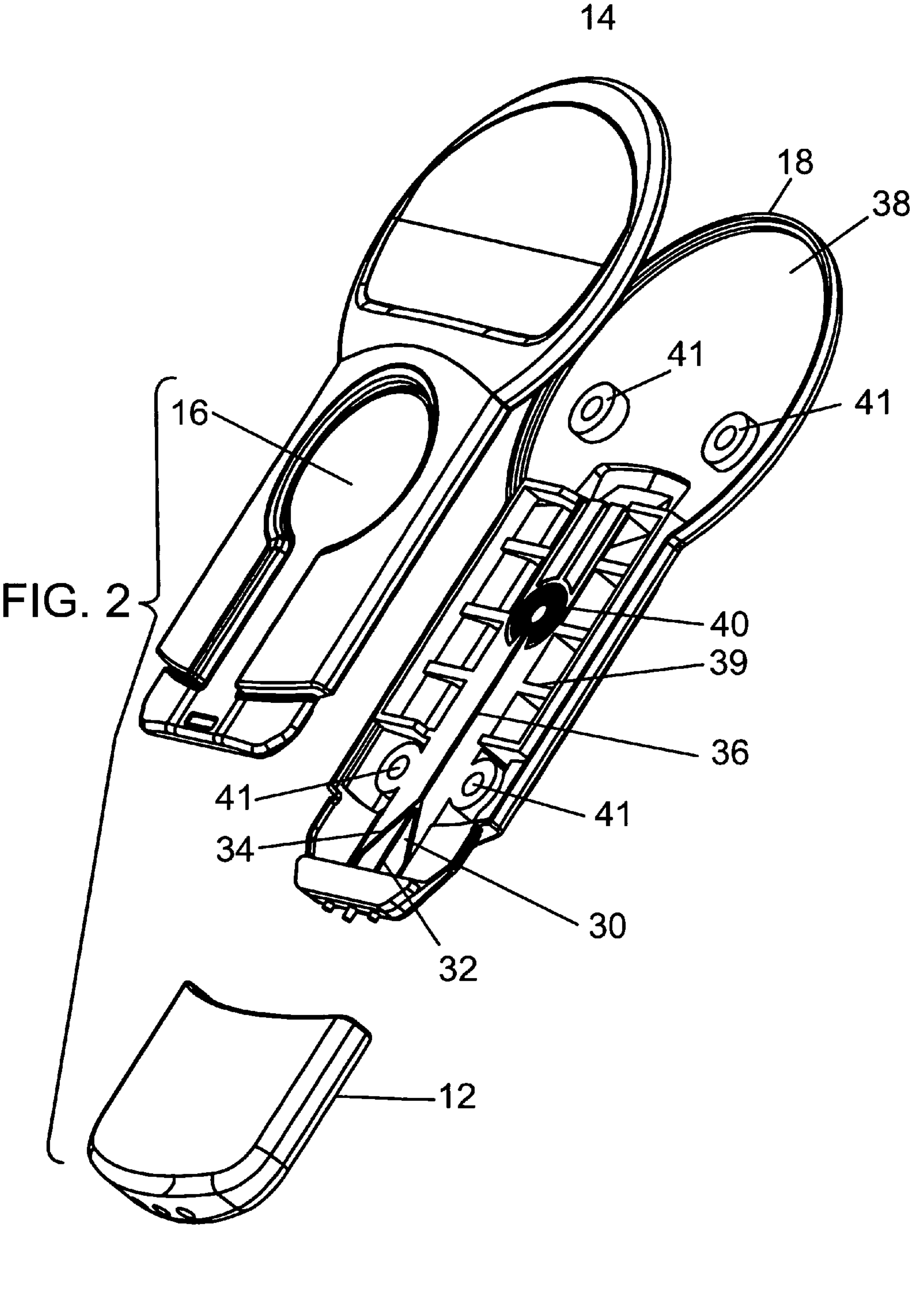
FIG. 2 is an exploded view of the elements of the reaction vessel shown in FIG. 1A showing upper and lower housing sections and cap.
Figure 9:
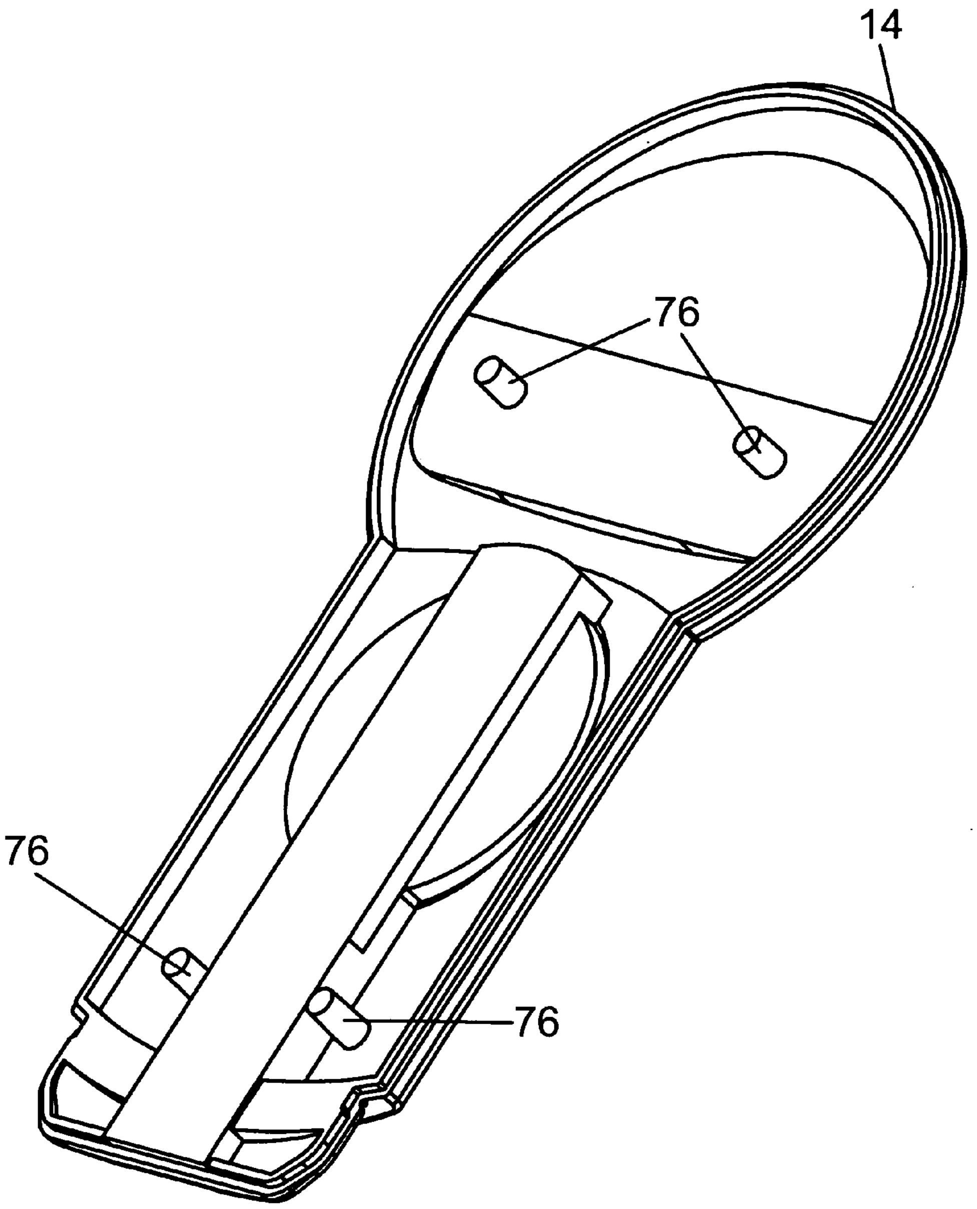
FIG. 9 is a perspective view of the interior of the upper housing section.

FIG. 2 shows an exploded top view of the reaction vessel 10 including fluid channels 30, 32, 34 and 36, waste reservoir 38, and reaction chamber 40. Also shown in FIG. 2 structural elements 39 are incorporated in lower housing 18. Also shown in FIG. 2 are receivers 41 for receiving alignment pegs 76 shown in FIG. 9 as incorporated in upper housing 14.

The upper and lower housing sections 14 and 18 are preferably fabricated using optically transparent plastics. Cap 12 is preferably fabricated from opaque plastic. Suitable materials include polystyrene, polycarbonate, acrylic, PET, cyclic olefin polymers and copolymers.

Figure 3:
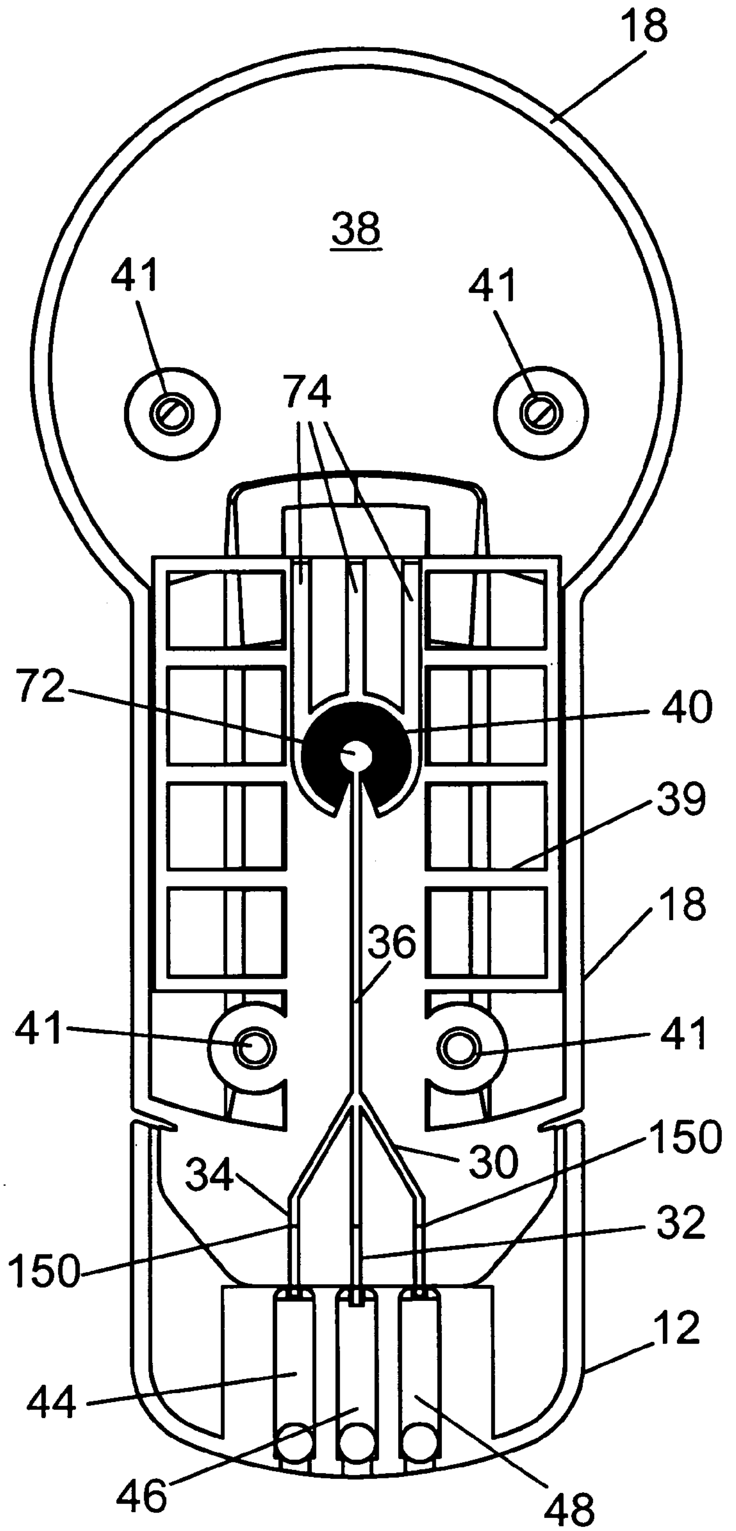
FIG. 3 is a plan view of the lower housing section with sectioned cap in place.
Figure 7B:
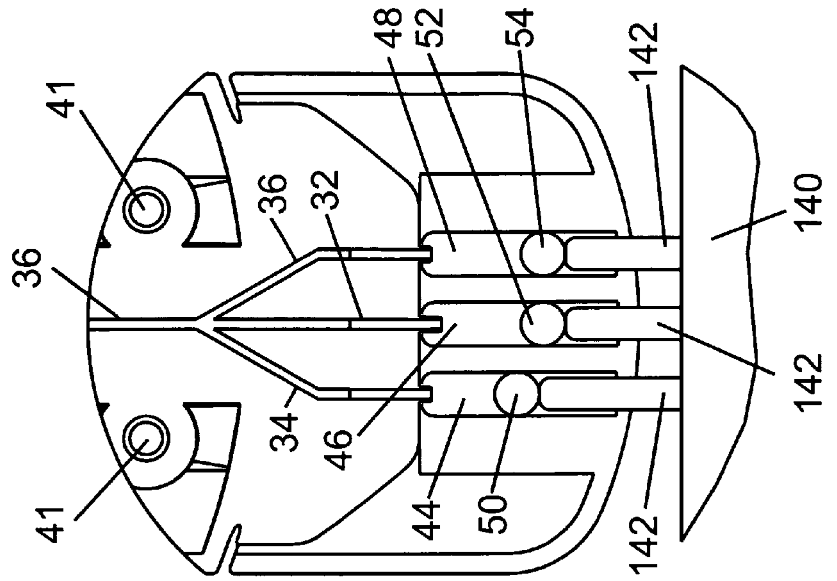
FIG. 7B is a schematic view of the cap engaged by the actuator mechanism shown in FIG. 7A.
Figure 7A:
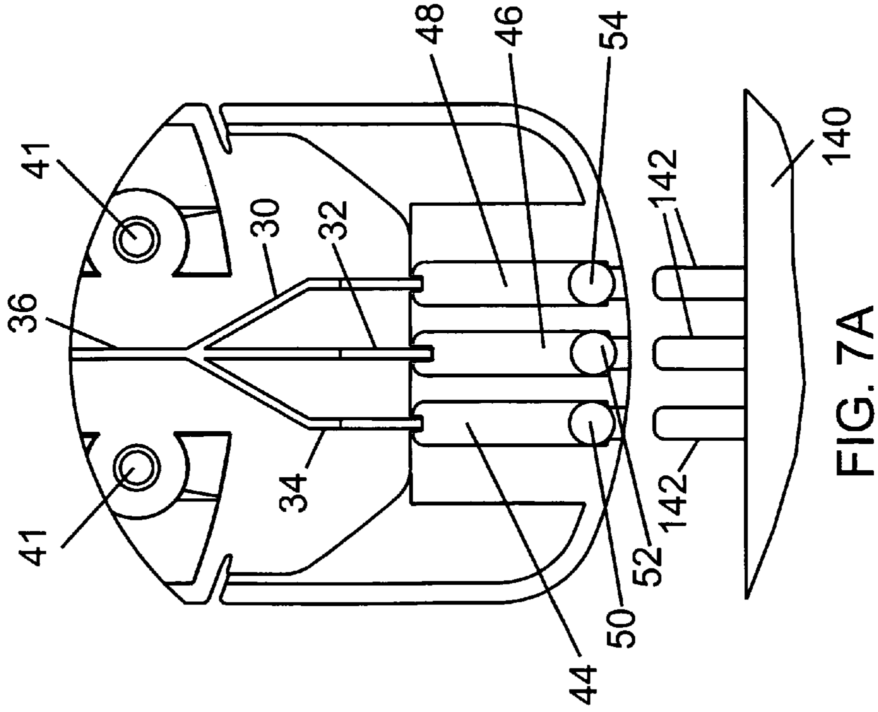
FIG. 7A is a schematic view of the cap installed on the lower housing section in proximity to an actuator mechanism.

FIG. 3 shows a plan view of lower housing 18 with a section view of installed cap 12 showing reagent reservoirs 44, 46, 48 while FIGS. 7A and 7B show associated piston elements 50, 52, and 54 respectively.

Figure 8:
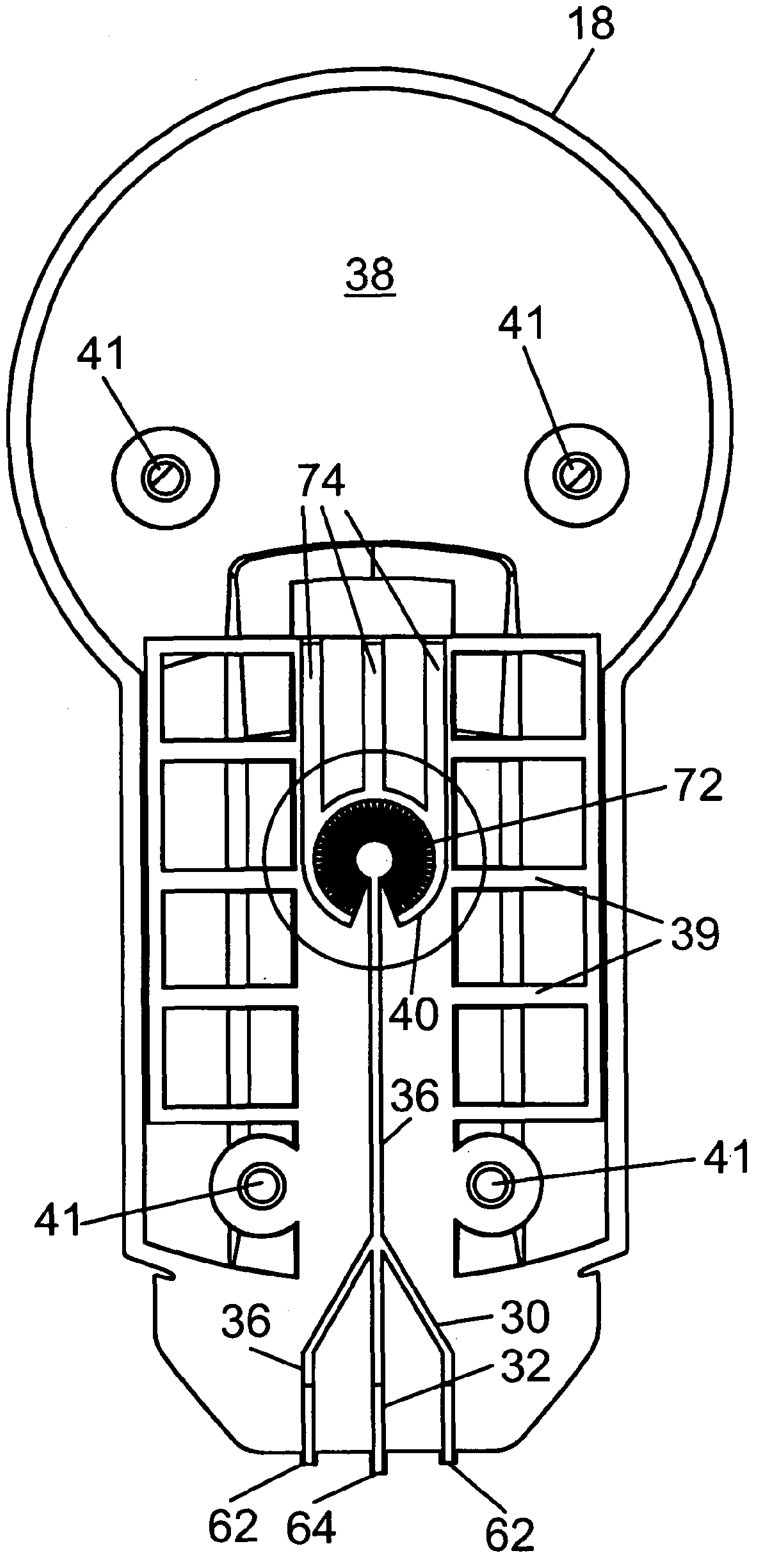
FIG. 8 is a plan view of the lower housing similar to FIG. 3 but without the cap.

FIG. 8 shows lower housing section 18 in plan view including fluid reservoir piercing elements 62 and combined sample entry and fluid reservoir piercing element 64. Referring to FIG. 8, the sample to be analyzed is introduced, preferably using capillary forces, through sample entry element 64, which is in fluid communication with fluid channel 32. Fluid channel 32, located in lower housing section 18, is, in this embodiment, an open channel segment which, when brought into sealing relationship with upper housing section 14, forms a fluid passageway of such cross section and dimension so as to create a capillary space which will draw the sample through sample entry element 64 into fluid channel 32 and convey the sample into common fluid channel 36 which is constructed in a manner to also generate capillary forces. From common channel 36, the fluid may be further drawn into reaction chamber 40, again using capillary forces or, optionally, active fluid transport means described hereinafter.

Figure 4:
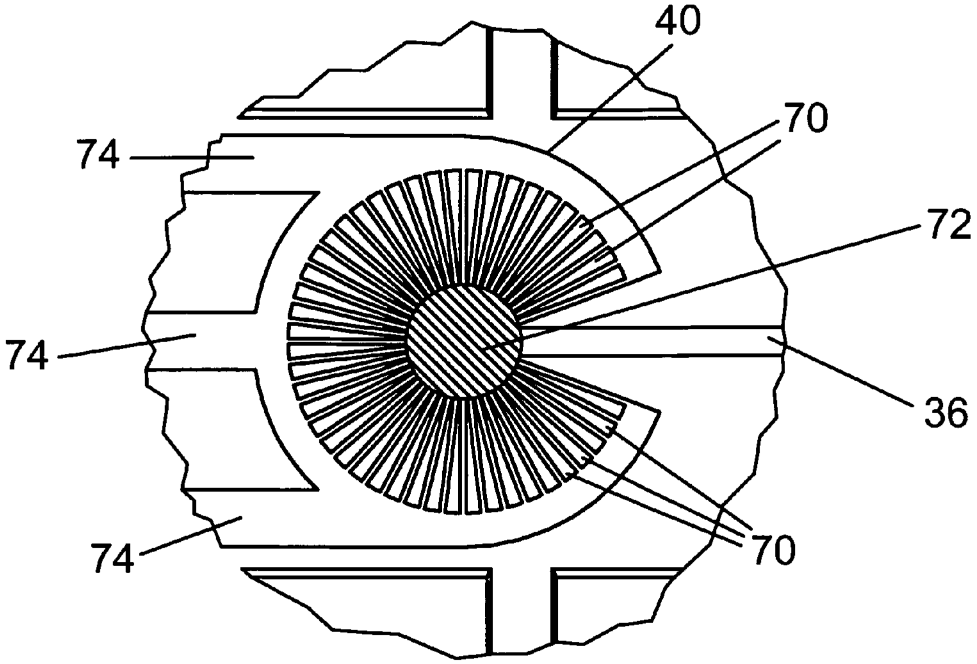
FIG. 4 is a detail view of the reaction chamber in the lower housing section and associated fluid channels.

Referring to FIG. 4, reaction chamber 40 contains an array of essentially radial microfluidic channels 70 (such as those described in U.S. patent application Ser. No. 11/021,545, incorporated herein in its entirety by reference) directed toward patterned area 72 and which may be configured to provide several different flow control properties. In one embodiment, the channels 70 serve as a flow control gating means whereby the transfer rate of fluids into and through the reaction chamber 40 may be controlled to a desired flow rate. Alternatively, the channels 70 may be disposed so as to provide a means of stopping the capillary flow until a sufficient additional pressure is applied to force initiation of flow through the microfluidic channels 70. It will be understood that the radial microfluidic channels 70 need not be straight but could be curved, the point is that the residence time at the reaction site is controlled by the pattern of microfluidic channels 70.

Figure 5:
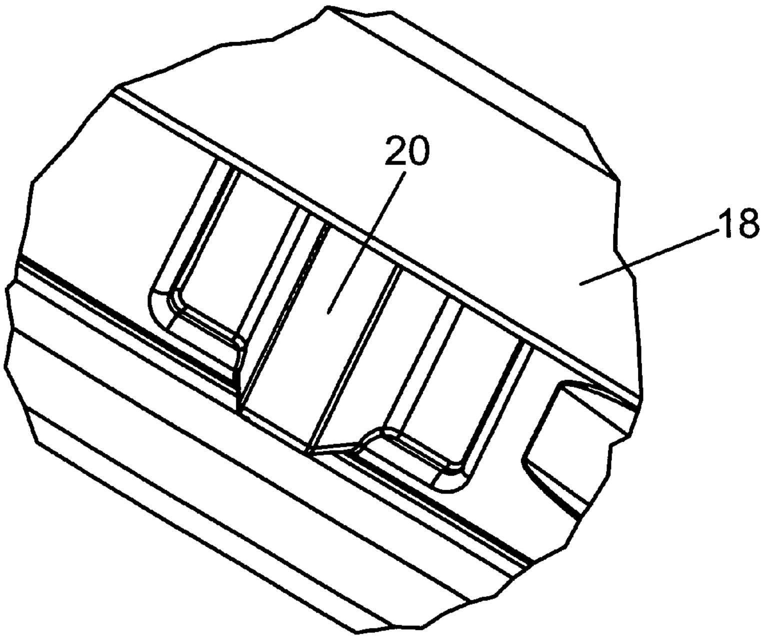
FIG. 5 is a detail view of the integrated optical element contained in the lower housing section adjacent to the reaction chamber.

FIG. 5 is a detail view of the integrated optical element 20 contained in lower housing section 18 located just below pattern element 72 shown in FIG. 4. The optical element 20 is desirably integrally formed as part of lower housing section 18. The shape and geometric structure of optical element 20 is chosen depending on the mode of optical interrogation being used whether it be transmission, reflection, TIR, fluorescence, etc. It should be noted that in a preferred embodiment, the configuration of optical element 20 will allow use of multiple modes of interrogation to be used simultaneously or each alone. The optical element 20 integrated with the housing portion 18 may be made of the same material as the housing with the integrated optic and housing being molded of a suitable plastic, or it may be a different material integrated with the housing portion 18. The shape of the optical element may be any suitable shape needed to guide the light beam to the area in the reaction chamber containing the pattern of analyte-specific receptors wherein the light beam interacts with the pre-selected pattern of analyte specific receptors and analytes bound thereto, and wherein the light beam that interacts with the pre-selected pattern of analyte-specific receptors and analytes bound thereto is a diffracted light beam which is directed away from the inner surface by the optical element to a detector located in the analyzer instrument into which the housing is inserted.

Embodiments exemplifying both arrangements will be discussed hereinafter. Fluid exiting microfluidic channels 70, conveyed radially from patterned area 72 may enter waste conduits 74 and thence conveyed to waste chamber 38. It should be noted that in this embodiment the completion of the structure of channels 30, 32, 34 and 36, reaction chamber 40, waste channels 74 and waste chamber 38 is accomplished by establishing a sealing relationship between the channel structures and upper housing section 14. Microfluidic channels 70 may be fabricated as an integral feature of lower housing section 18 or may be fabricated as a separate insertable structure (not shown) or may be fabricated as an integral feature of upper housing section 14.

Within reaction chamber 40 and circumscribed by microfluidic channels 70 is the patterned area 72 comprised of analyte specific receptors arranged in a non-random pattern so as to constitute a diffraction grating as described in U.S. Pat. No. 7,008,794 issued to Goh et al. entitled METHOD AND APPARATUS FOR ASSAY FOR MULTIPLE ANALYTES and U.S. Pat. No. 6,436,651 Optical diffraction biosensor (all of which are incorporated herein by reference in their entirety) which may be produced using the micro-stamping apparatus described in co-pending U.S. Pat. No. 6,981,445 issued to Cracauer, et al. entitled METHOD AND APPARATUS FOR MICRO-CONTACT PRINTING, the contents of which are incorporated herein in its entirety. Alternative means of generation of patterned area 72 are not excluded from the present invention. The patterns may be regular equi-spaced parallel lines or they may be more complicated patterns as disclosed in co-pending U.S. patent application Ser. Nos. 09/814,161, 10/242,778, and 11/196,483 or in U.S. Pat. No. 7,223,534 entitled Diffraction-Based Diagnostic Devices all of which are incorporated by reference herein in their entirety. The composition of the pattern elements may be analyte specific receptors such as antibodies, proteins, antigens, DNA or RNA strands of natural or synthetic origin; avidin, streptavidin, biotin, polymeric materials prepared to have bio-conjugation chemistries or may be more complex.

Signal degradation is an explicitly anticipated mode of operation wherein an existing signal, diffractive or otherwise, generated by the base pattern is reduced or degraded by the presence of an analyte of interest. Such degradation can result from displacement of elements of the pattern by competitive interactions, physical alteration of the characteristics of the pattern such as swelling or shift in apparent refractive index or general changes in shape resultant from chemical interactions between materials in the sample and the constituents of pattern element 72.

The composition of pattern element 72 is not limited to a binding receptor specific to a single analyte. Multiple receptors may be combined to respond to a plurality of analytes of interest. The presence of any of the analytes will generate a detectable signal. This embodiment is of particular use when it is desired to screen a sample for a class or classes of substances, the presence of any one or more would justify subsequent analysis of a more specific nature.

When the sample is presented to the patterned element 72, a binding reaction may occur. This reaction will, when the receptors forming patterned element 72 are configured in a diffraction-producing arrangement, be detectable by interrogation with a beam of coherent light as disclosed in U.S. Pat. No. 7,008,794 issued to Goh et al. entitled METHOD AND APPARATUS FOR ASSAY FOR MULTIPLE ANALYTES.

As shown schematically in FIG. 6A, provision of integrated optical element 20 allows the incident beam 100 to impinge on patterned area 72 within reaction chamber 40 and in total internal reflection (TIR) produce at least one diffraction order beam 102 which may be detected by an appropriate photodetector 104 incorporated into an associated instrument and subsequently quantified and optionally analyzed by the associated instrument (not shown).

Figure 6A:
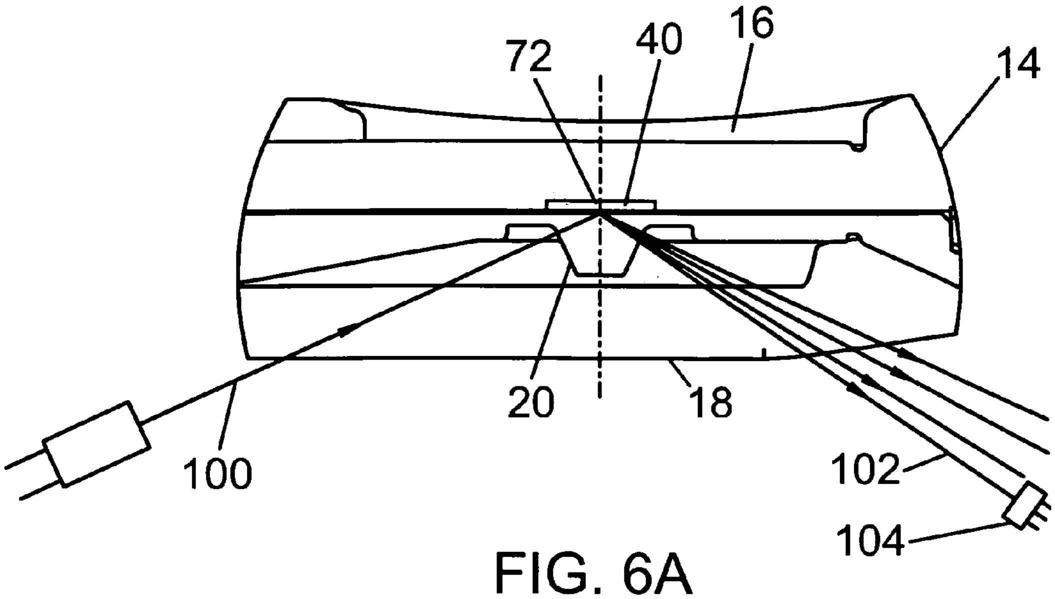
FIG. 6A is a view of the optical path showing a part of the assembled reaction vessel illustrating an embodiment of the optical path into and out of the reaction chamber using total internal reflection (TIR)

It should be noted that the arrangement shown in FIG. 6A also allows measurement of the refractive index of solutions within reaction chamber 40. Fluids of differing refractive indexes will, in conjunction with a diffraction grating of fixed index, produce diffraction orders of greater or lesser intensity depending on relative differences between the index of the grating and the fluid. This difference is readily quantified and can be used to calculate the refractive index of the fluid.

Figure 6B:
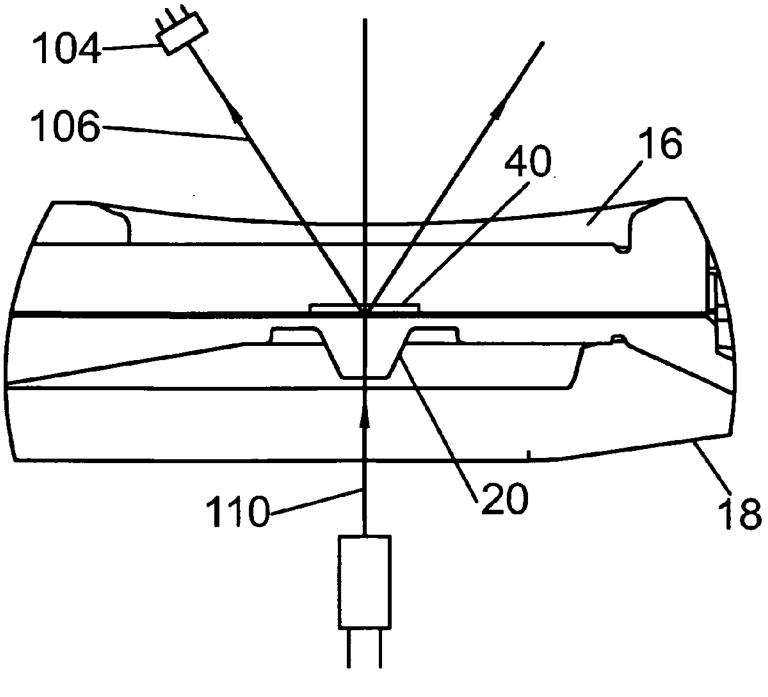
FIG. 6B is a view of the optical path showing a part of the assembled reaction vessel illustrating an embodiment of the optical path into and out of the reaction chamber using showing transmission.

In another embodiment, a transmissive diffraction process may be employed as shown in FIG. 6B. In this embodiment, incident beam 110 impinges pattern 72 and at least one diffractive order 106 is generated and transmitted through window 16 incorporated into upper housing section 14 and is thus available for detection by an appropriate photodetector 104, which may be a photodiode incorporated into an associated instrument and subsequently quantified and optionally analyzed by the associated instrument (not shown). In this embodiment, window 16 is essentially optically clear in the appropriate wavelength. Alternatively, if the optical window 16 is of translucent construction, the projection of diffractive order 106 may be visible to the unaided eye. If the diffractive elements in pattern 72 are properly selected, binding or pattern disruptive reactions can result in visually detectable changes in the configuration and/or direction of said diffractive orders as disclosed in U.S. Pat. No. 6,180,288 entitled GEL SENSORS AND METHOD OF USE THEREOF. It should be noted that window 16 may incorporate lenses, prisms or other optical elements to facilitate direction of light to detectors.

Figure 6C:
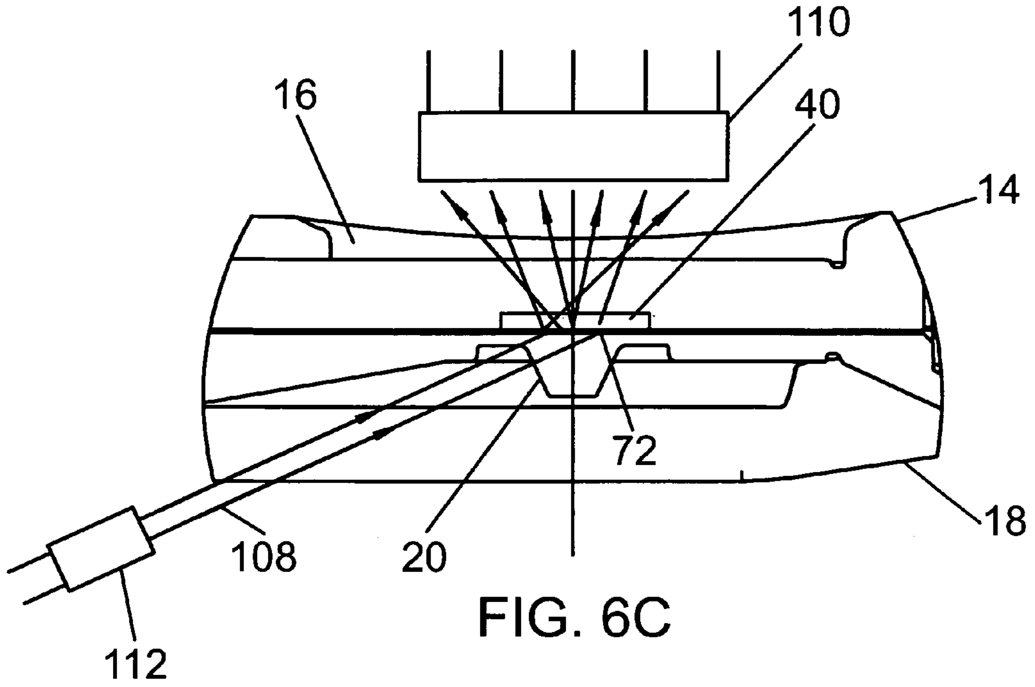
FIG. 6C is a view of the optical path showing a part of the assembled reaction vessel illustrating an embodiment of the optical path into and out of the reaction chamber using fluorescence.

In another embodiment, shown schematically in FIG. 6C, a fluorescent detection scheme may be employed whereby secondary reagents (to be described hereinafter) bound to pattern 72 may contain a fluorescent compound or compounds which may be induced by an incident beam of light 108 (which may or may not be coherent) which is emitted by light source 112 incorporated into an associated instrument (not shown), containing a wavelength appropriate to the specific fluorescent compound, to reemit light at a shifted wavelength in a more or less non-directional manner. The induced fluorescence may be monitored by means of a filtered photodetector 110, which may be a photodiode, incorporated into an associated instrument and subsequently quantified and optionally analyzed by the associated instrument (not shown). It will be appreciated that this embodiment may be configured so that the filtered photodetector 110 is located on the other side of the housing to detect fluorescence emitted from the same side as the beam of light illuminating the pattern.

Figure 6D:
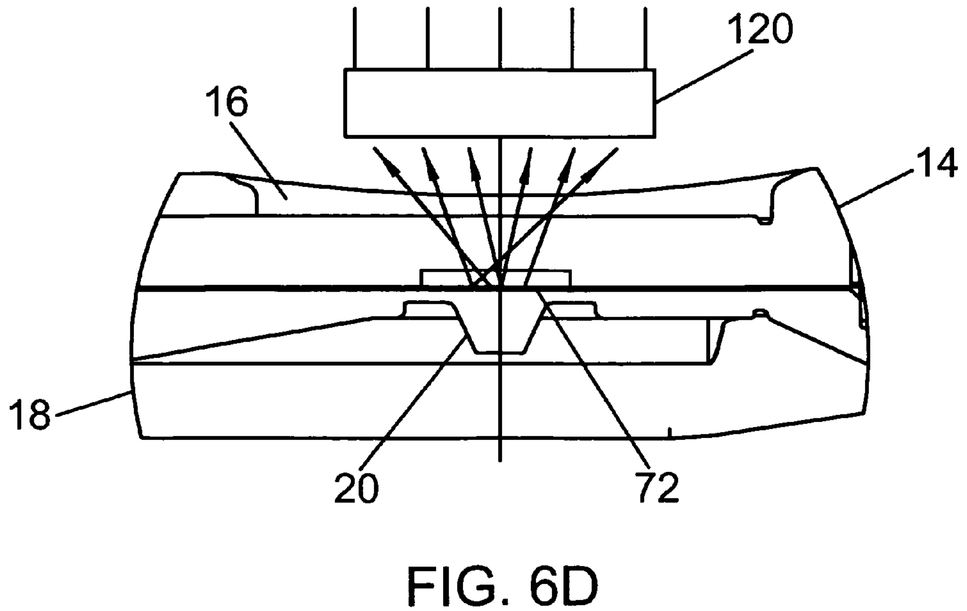
FIG. 6D is a view of the optical path showing a part of the assembled reaction vessel illustrating an embodiment of the optical path into and out of the reaction chamber using chemilumenescence.

A fourth embodiment, shown in FIG. 6D utilizes a chemiluminescent reaction using an appropriate enzyme bound to patterned element 72 and appropriate substrates delivered to patterned element 72 to produce generally non-directional light. The light may be monitored by means of an appropriate detector 120, which may be a CCD or PMT, incorporated into an associated instrument and subsequently quantified and optionally analyzed by the associated instrument (not shown). As mentioned above with respect to the embodiment of FIG. 6C, the embodiment of FIG. 6D may be so that the detector 120 is located on the other side of the housing to detect the chemiluminesce emitted from the same side as the beam of light illuminating the pattern.

Another embodiment of the invention allows for measurement of optical density and/or turbidity of fluids in the reaction chamber 40, using an optical arrangement essentially similar to that shown in FIG. 6B. These measurements may be made either by detection using a diffractive order beam or the main beam from the light source. Light scatter resultant from particulate matter in the fluid may also be measured in this embodiment.

While these signal generation and detection embodiments described above are described as individual constructions, there is no limitation to combining the techniques for multiple concurrent modes of signal detection and quantitation or for use as means of reference signals, controls and the like. Additionally light sources and detectors may be of construction alternative to the illustrative examples above.

During and after the execution of the subject assay, which may require several fluid addition steps described hereinafter, various reacting fluids may have to move through the reaction chamber 40. To allow for this transit of fluids, the disposable reaction vessel 10 is provided with a waste chamber 38, shown in FIG. 8, adequate to contain all fluids utilized during the performance of the assay. Transport of fluids to the waste chamber 38 may be accomplished by means of microfluidic capillary channels (not shown), active pumping means (described hereinafter), wicking elements within said waste chamber 38, (not shown), hygroscopic gels within the waste chamber, gravity or externally applied vacuum. This list is exemplary only and other means will be apparent to one skilled in the art.

Figure 10B:
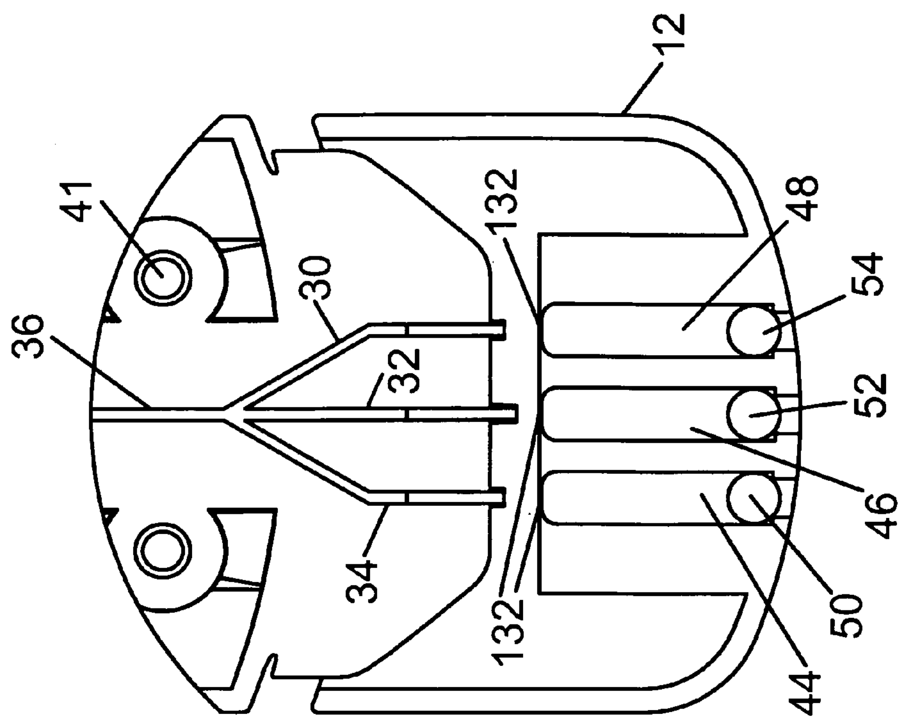
FIG. 10 A is a detail section view of the cap installed on the lower housing section.
Figure 10A:
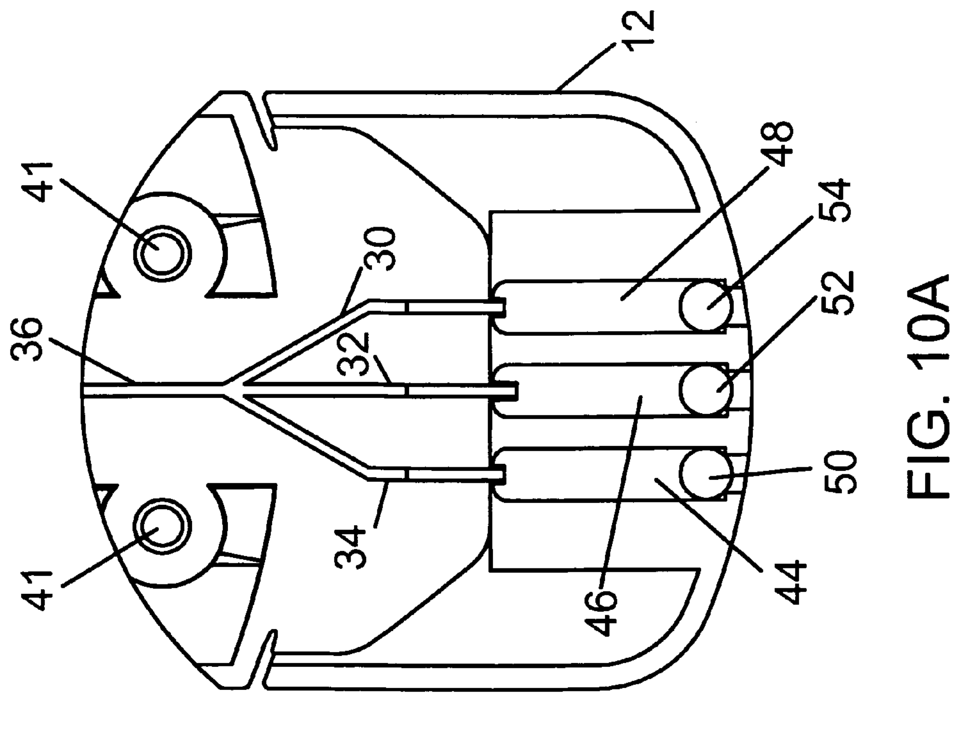

A variety of assay types, discussed hereinafter, are supported by the embodiments disclosed herein. Some of these assays may be completed using only the sample. Others require multiple reagent and/or wash steps to be accomplished. One embodiment may incorporate an end cap 12, which may contain at least one liquid reagent or buffer. FIG. 10B shows the general configuration of an embodiment of end cap 12.

Some embodiments of the disposable reaction vessel may include a fluid displacement means associated with each liquid reservoir to force liquid contents contained therein into the flow passageways leading from the inlets to the reaction chamber 40. Such fluid displacements means may include, but are not limited to pressurizing means for pressurizing each of the liquid reservoirs to force the liquids contained therein into the flow passageways. It may also include the use of a piston assembly in which includes a piston associated with each liquid reservoir and means for moving each piston independent of the other pistons. Illustratively, three reagent reservoirs 44, 46 and 48 within cap 12 are shown.

The reservoirs are generally cylindrical in conformation and are formed integrally with the outer structure of the cap 12 and are provided with piston elements 50, 52 and 54, respectively in sealing relationship to the interior of the reservoirs. A cylindrical interior shape is the preferred embodiment for the reservoirs when cylindrical pistons are used, but other configurations are possible. The pistons 50, 52 and 54 are shown as essentially spherical balls, but other configurations are possible. Pistons may be constructed of a variety of plastics including polyethylene, polypropylene, polyurethane, synthetic rubbers, polyvinyl chloride and copolymers or blends thereof, fluorpolymers or may be constructed of suitable metals or ceramic materials. The fluid reservoirs 44, 46 and 48 with pistons 50, 52 and 54 installed, may be filled with desired buffers or reagents prior to sealing with pierceable closures 132. Such closures may be implemented with foil or polymer films retained by heat seals or adhesive means. Alternatively, a simple plug may be used which may be displaced by piercing elements 62 and sample inlet 64. Fluid communication between the fluid reservoirs and the balance of the fluid path is accomplished by full installation of cap 12 onto the assembled lower section 18 and upper section 14. Lower housing section 14 is provided with the piercing elements 62 and piercing and sample inlet 64 which are so constructed as to pierce said closures 132 and establish fluidic communication between the fluid reservoirs and the fluid path of the assembled lower and upper sections. Displacement of fluids contained within the reservoirs into the fluid path of the assembled section may be accomplished by moving the pistons. The pistons 50, 52, and 54 may be slidingly moved relative to reservoirs 44, 46, 48 by a simple external actuating mechanism 140 schematically shown in FIGS. 7A and 7B. Appropriate mechanisms include rods or linkages manually activated by the user, automated or semi-automated linear motion devices including but not limited to microprocessor and software controlled linear stepper motors.

Alternatively, displacement of the pistons may be accomplished by motion of reaction vessel 10 relative to the pins 142 which are arranged to align with the pistons. Such relative motion may be achieved manually by the act of the operator inserting the device into an appropriately configured receptacle in an instrument or by automated or semi-automated motion control devices. Sequential displacement of the pistons may be achieved readily even with manual actuation if the relationship between the pistons and aforementioned actuation means are configured in a manner such that the pins are of different lengths as illustrated schematically in FIG. 7B. This implementation incorporates relatively longer or shorter rods 142 to engage pistons 50, 52, 54. As noted heretofore, pins 142 may be independently actuated by a variety of means.

The disposable reaction vessel 10 may be used without reagent containing cap 12 if used in conjunction with external means of delivering desired reagent(s) directly to inlets 62 and 64. Said means may be manual or automated.

In an embodiment of the invention, reagents required to complete assays may be deposited in dry format in any of the fluid passages leading to reaction chamber 40. Reagent deposition may be accomplished by several means including ink jet followed by a drying process, micro-encapsulation, direct pipetting, deposition of pastes and other means obvious to one skilled in the art. During assay processing, the passage of fluid across the reagent will rehydrate or entrain the reagent and carry it to reaction chamber 40. Suitable locations for such reagents are shown in FIG. 3 at locations 150.

Assay formats which are amenable to be used in reaction vessel 10 include single stage direct binding to an immobilized capture molecule, sandwich and half sandwich assays, amplified assays of various types, including enzymatic amplification as typified by precipitation reactions, colorometric reactions, fluorescent reactions, and chemi-luminescent reactions. It should be noted that amplification may be performed without the use of enzymatic processes. For example, direct labeling of a detector reagent using fluorescent compounds or particles may be employed. Other variations will be apparent to one skilled in the art. Displacement assay formats, turbidimetric, optical density readings and determinations of refractive indexes of fluids are enabled by various embodiments as described heretofore.

Analytical techniques which may be applied to the signal output of assays performed with the invention in order to quantify the analyte of interest include kinetic analysis, time to signal, end point, ratioed end point and curve fits.

Collection and analysis of data is best suited to a simple reader instrument that executes a predetermined series of manipulations to the invention using the fluid transport and optical interrogation features provided by the present invention. Predetermined analytical parameters would be applied to the signal outputs and interpretation ranging from a simple positive/negative result to precise concentration analysis can be accomplished by use of pre-established calibration information retained in such an instrument.

As used herein, the terms "comprises", "comprising", "including" and "includes" are to be construed as being inclusive and open ended, and not exclusive. Specifically, when used in this specification including claims, the terms "comprises", "comprising", "including" and "includes" and variations thereof mean the specified features, steps or components are included. These terms are not to be interpreted to exclude the presence of other features, steps or components.

The foregoing description of the preferred embodiments of the invention has been presented to illustrate the principles of the invention and not to limit the invention to the particular embodiment illustrated. It is intended that the scope of the invention be defined by all of the embodiments encompassed within the following claims and their equivalents.

Therefore, what is claimed is:

1. A disposable reaction vessel, comprising:

a) a housing including a first housing section and a second housing section form fitted to said first housing section so that when the first and second housing sections are assembled to form said housing they are in sealing relationship;

b) a reaction chamber located inside of said housing;

c) an optical element integrally formed on an outside surface of the second housing section and located adjacent to said reaction chamber on the inside of the housing, said second housing section being at least partially constructed of a material which will transmit light to and from the reaction chamber;

d) a waste reservoir located on an interior of said housing, e) a first flow passageway between said reaction chamber and said waste reservoir;

f) reagent and sample inlets located at a first end portion of said housing;

g) a second flow passageway between said reagent and sample inlets and said reaction chamber;

h) an end cap having a size and shape to slide over said first end portion and snap fit thereon to be locked onto said housing and form a leak tight seal, wherein said end cap includes at least one liquid reservoir for holding reagents and/or liquid sample, said at least one liquid reservoir including pierceable sealing means, and wherein said reagent and sample inlets pierce said pierceable sealing means when said end cap is slid onto said housing;

i) a pattern of analyte-specific receptors bound to an inner surface of the reaction chamber, the patterned area being substantially surrounded by an array of radially oriented microfluidic channels configured to direct fluid from said reaction chamber radially outward to said first flow passageway; and j) said optical element directs a light beam to the reaction chamber for interrogating the pattern of analyte specific receptors, wherein the light beam interacts with the pre-selected pattern of analyte specific receptors and analytes bound thereto, and wherein the light beam that interacts with the pre-selected pattern of analyte-specific receptors and analytes bound thereto is a diffracted light beam which is directed away from said inner surface by said optical element.

2. The vessel according to claim 1 wherein said reagent and sample inlets are spaced apart, and wherein said second flow passageway includes branches each associated with a sample or reagent inlet, said branches converging to a common passageway which terminates at said reaction chamber.

3. The vessel according to claim 1 wherein said end cap includes a label affixed thereto to indicate identity of the reagents and liquid sample sealed therein.

4. The vessel according to claim 1 including fluid displacement means associated with each of the liquid reservoirs for displacing the reagents and sample into said second flow passageway.

5. The vessel according to claim 4 wherein said fluid displacement means includes means for pressurizing each of said liquid reservoirs to force liquid contents contained therein into said second flow passageway.

6. The vessel according to claim 4 wherein said fluid displacement means includes a piston assembly with a piston associated with each liquid reservoir and means for moving each piston independent of the other pistons.

7. The vessel according to claim 1 wherein said second flow passageway has dimensions selected to give capillary flow therein so that upon introduction of the reagents and sample to their respective inlets, capillary forces draw them into the second flow passageway towards said reaction chamber.

8. The vessel according to claim 1 wherein said first flow passageway has dimensions selected to give capillary flow therein so that the reagents and sample are drawn out of said reaction chamber after a designated diffraction assay by capillary forces to draw them into the waste chamber.

9. The vessel according to claim 1 wherein at least one of said first and second housing sections, or both, includes a keying mechanism, said keying mechanism providing a mechanical interface and alignment to an analyser instrument which is used in conjunction with said vessel.

10. The vessel according to claim 9 wherein said keying mechanism includes at least one guide rail extending along an outer surface of at least one of the first and second housing sections the first and second housing sections.

11. The vessel according to claim 1 wherein one of said first and second housing sections, or both, includes a label affixed thereto.

12. The vessel according to claim 11 wherein said label is one of a human readable label and a machine readable label, or both.

13. The vessel according to claim 12 wherein said machine readable label is selected from the group consisting of bar codes and radio frequency (RF) identifiers.

14. The vessel according to claim 1 including fluorescent compounds bound to, or interacting with, said pattern of analyte-specific receptors which can be induced by an incident beam of light, which may or may not be coherent, to fluoresce and reemit light at a shifted wavelength in a more or less non-directional manner, which is detectable by a photodetector.

15. The vessel according to claim 1 including chemiluminescent compounds bound to, or interacting with, said pattern of analyte-specific receptors which can be induced by an incident beam of light, which may or may not be coherent, to chemiluminesce and emit light in a more or less non-directional manner, which is detectable by a photodetector.

16. A disposable reaction vessel comprising:

a) a housing including a first housing section and a second housing section form fitted to said first housing section so that when the first and second housing sections are assembled to form said housing they are in sealing relationship;

b) a reaction chamber located inside of said housing;

c) an optical element integrally formed on an outside surface of the second housing section and located adjacent to said reaction chamber on the inside of the housing, said second housing section being at least partially constructed of a material which will transmit light to and from the reaction chamber;

d) a waste reservoir located on an interior of said housing;

e) a first flow passageway between said reaction chamber and said waste reservoir;

f) at least one sample inlet and at least one reagent inlet located at a first end portion of said housing;

g) a second flow passageway between said reagent and sample inlets and said reaction chamber;

h) an end cap having a size and shape to slide over said first end portion and snap fit thereon to be locked onto said housing and form a leak tight seal, and wherein said end cap includes a separate liquid reservoir for holding reagents or liquid sample associated with each of the inlets and pierceable sealing means sealing each liquid reservoir, wherein each inlet includes a piercing means associated therewith for piercing said pierceable sealing means and at least one of said liquid reservoirs being pre-filled with selected reagents;

i) a pattern of analyte-specific receptors bound to an inner surface of the reaction chamber, the patterned area being substantially surrounded by an array of radially oriented microfluidic channels configured to direct fluid from said reaction chamber radially outward to said first flow passageway; and j) said optical element to direct a light beam to the reaction chamber for interrogating the pattern of analyte specific receptors, wherein the light beam interacts with the pre-selected pattern of analyte specific receptors and analytes bound thereto, and wherein the light beam that interacts with the pre-selected pattern of analyte-specific receptors and analytes bound thereto is a diffracted light beam which is directed away from said inner surface by said optical element.

17. The vessel according to claim 16 including fluid displacement means associated with each of the liquid reservoirs for displacing the reagents and sample into said second flow passageway.

18. The vessel according to claim 17 wherein said fluid displacement means includes means for pressurizing each of said liquid reservoirs to force liquid contents contained therein into said second flow passageway.

19. The vessel according to claim 17 wherein said fluid displacement means includes a piston assembly with a piston associated with each liquid reservoir and means for moving each piston independent of the other pistons.

20. The vessel according to claim 16 wherein said second flow passageway has dimensions selected to give capillary flow therein so that upon introduction of the reagents and sample to their respective inlets, capillary forces draw them into the second flow passageway towards said reaction chamber.

21. The vessel according to claim 16 wherein said first flow passageway has dimensions selected to give capillary flow therein so that the reagents and sample are drawn out of said reaction chamber after a designated diffraction assay by capillary forces to draw them into the waste chamber.

22. The vessel according to claim 16 wherein at least one of said first and second housing sections, or both, includes a keying mechanism, said keying mechanism providing a mechanical interface and alignment to an analyser instrument which is used in conjunction with said vessel.

23. The vessel according to claim 22 wherein said keying mechanism includes at least one guide rail extending along an outer surface of at least one of the first and second housing sections.

24. The vessel according to claim 16 wherein said end cap includes a label affixed thereto to indicate identity of the reagents and liquid sample sealed therein.

25. The vessel according to claim 16 wherein one of said first and second housing sections, or both, includes a label affixed thereto.

26. The vessel according to claim 25 wherein said label is one of a human readable label and a machine readable label, or both.

27. The vessel according to claim 26 wherein said machine readable label is selected from the group consisting of bar codes and radio frequency (RF) identifiers.

28. The vessel according to claim 16 including fluorescent compounds bound to, or interacting with, said pattern of analyte-specific receptors which can be induced by an incident beam of light, which may or may not be coherent, to fluoresce and reemit light at a shifted wavelength in a more or less non-directional manner, which is detectable by a photodetector.

29. The vessel according to claim 16 including chemiluminescent compounds bound to, or interacting with, said pattern of analyte-specific receptors which can be induced by an incident beam of light, which may or may not be coherent, to chemiluminesce and emit light in a more or less non-directional manner, which is detectable by a photodetector.

* * * * *